United States Patent
Appler et al.

(10) Patent No.: US 9,435,574 B2
(45) Date of Patent: Sep. 6, 2016

(54) COMPOSITIONS AND METHODS FOR INJECTION OF SEALANTS AND/OR DRYING AGENTS INTO AIR CONDITIONING AND REFRIGERATION SYSTEMS

(71) Applicants: Paul Appler, Windsor (CA); George E. Cranton, London (CA); Jack Brass, Toronto (CA)

(72) Inventors: Paul Appler, Windsor (CA); George E. Cranton, London (CA); Jack Brass, Toronto (CA)

(73) Assignee: CLIPLIGHT HOLDINGS, LTD., Toronto, Ontario (CA)

( * ) Notice: Subject to any disclaimer, the term of this patent is extended or adjusted under 35 U.S.C. 154(b) by 38 days.

(21) Appl. No.: 14/186,268

(22) Filed: Feb. 21, 2014

(65) Prior Publication Data
US 2014/0165625 A1 Jun. 19, 2014

Related U.S. Application Data

(63) Continuation of application No. 13/046,488, filed on Mar. 11, 2011, now abandoned, which is a continuation of application No. PCT/CA2009/001264, filed on Sep. 11, 2009, which (Continued)

(51) Int. Cl.
*F25B 45/00* (2006.01)
*B60H 1/00* (2006.01)
(Continued)

(52) U.S. Cl.
CPC .......... *F25B 45/00* (2013.01); *B60H 1/00585* (2013.01); *C09K 3/12* (2013.01);
(Continued)

(58) Field of Classification Search
CPC .............. B60H 1/00585; F25B 45/00; F25B 2500/221; C10M 171/008; C10M 2203/065; C10M 2205/04; C10M 2207/2835; C10M 2209/084; C10M 2209/1033; C10M 2227/04; C10M 2220/302; C10M 2205/003; C10M 2205/223; C10M 2209/062; C10M 2209/1003; C10M 2217/026; C10M 2220/301; C10M 2240/22; C09K 3/12
USPC ..................................................... 62/77, 292
See application file for complete search history.

(56) References Cited

U.S. PATENT DOCUMENTS 2,185,332 A 1/1940 Crampton
3,580,939 A 5/1971 Ceyzeriat et al.
(Continued)

FOREIGN PATENT DOCUMENTS

DE 19812819 A1 9/1999
WO WO 02/073102 A1 9/2002

OTHER PUBLICATIONS

International Preliminary Report on Patentability for PCT/CA2005/000846 dated Oct. 18, 2006.
(Continued)

*Primary Examiner* — Mohammad M Ali
(74) *Attorney, Agent, or Firm* — Dentons US LLP; Karthika Perumal

(57) ABSTRACT

A method for maintaining a charged and pressurized air conditioning or refrigeration system, such method including introducing into the system fluid of the air conditioning or refrigeration system a hydrolytic drying agent, and distributing the hydrolytic drying agent throughout the system fluid; methods of maintaining a charged and pressurized air conditioning or refrigeration system including introducing a hydrolytic drying agent and a sealing agent; devices for maintaining a charged and pressurized air conditioning or refrigeration system which include a sealed vessel containing a hydrolytic drying agent and a sealant; kits for the same.

15 Claims, 2 Drawing Sheets

Related U.S. Application Data is a continuation-in-part of application No. 11/941,364, filed on Nov. 16, 2007, now Pat. No. 8,065,884, which is a continuation of application No. 10/860,646, filed on Jun. 4, 2004, now Pat. No. 7,296,423.

(60) Provisional application No. 61/096,208, filed on Sep. 11, 2008.

(51) Int. Cl.
*C09K 3/12* (2006.01)
*C10M 171/00* (2006.01)

(52) U.S. Cl.
CPC .. *C10M 171/008* (2013.01); *C10M 2203/065* (2013.01); *C10M 2205/003* (2013.01); *C10M 2205/04* (2013.01); *C10M 2205/223* (2013.01); *C10M 2207/2835* (2013.01); *C10M 2209/062* (2013.01); *C10M 2209/084* (2013.01); *C10M 2209/1003* (2013.01); *C10M 2209/1033* (2013.01); *C10M 2217/026* (2013.01); *C10M 2227/04* (2013.01); *C10N 2220/301* (2013.01); *C10N 2220/302* (2013.01); *C10N 2240/22* (2013.01); *F25B 2500/221* (2013.01)

(56) References Cited

U.S. PATENT DOCUMENTS

| | | | |
|---|---|---|---|
| 3,663,138 A | 5/1972 | Petroff | |
| 3,943,987 A | 3/1976 | Rossi | |
| 4,237,172 A | 12/1980 | Packo et al. | |
| 4,304,805 A | 12/1981 | Packo | |
| 4,331,722 A | 5/1982 | Packo et al. | |
| 4,379,067 A | 4/1983 | Packo | |
| 4,442,015 A | 4/1984 | Packo et al. | |
| 4,450,087 A * | 5/1984 | Askew | C10M 1/08 252/73 |
| 4,508,631 A | 4/1985 | Packo et al. | |
| 4,537,214 A | 8/1985 | Cowan | |
| 4,745,772 A | 5/1988 | Ferris | |
| 4,938,063 A | 7/1990 | Leighley | |
| 5,015,782 A | 5/1991 | Harandi | |
| 5,027,606 A * | 7/1991 | Short | C09K 5/045 252/68 |
| 5,070,917 A | 12/1991 | Ferris et al. | |
| 5,167,140 A | 12/1992 | Cooper et al. | |
| 5,250,205 A * | 10/1993 | Akimoto | C10M 107/34 252/68 |
| 5,391,312 A * | 2/1995 | Senaratne | C07C 69/34 252/72 |
| 5,417,873 A | 5/1995 | Packo | |
| 5,436,356 A | 7/1995 | Drent et al. | |
| 5,440,919 A | 8/1995 | Cooper | |
| 5,461,883 A * | 10/1995 | Terasaki | B01D 15/00 62/129 |
| 5,540,254 A | 7/1996 | McGowan et al. | |
| 5,653,909 A * | 8/1997 | Muraki | C10M 169/04 252/67 |
| 5,767,047 A * | 6/1998 | Duncan | C10M 105/38 508/485 |
| 5,842,349 A | 12/1998 | Wakita et al. | |
| 5,882,543 A | 3/1999 | Peterson et al. | |
| 5,922,239 A | 7/1999 | Nakagawa et al. | |
| 5,975,151 A | 11/1999 | Packo | |
| 5,996,651 A | 12/1999 | Scaringe | |
| 5,999,700 A | 12/1999 | Geers | |
| 6,089,032 A | 7/2000 | Trachtenberg | |
| 6,183,663 B1 | 2/2001 | Kalley et al. | |
| 6,261,474 B1 | 7/2001 | Egawa et al. | |
| 6,378,328 B1 | 4/2002 | Cholkeri et al. | |
| 6,385,986 B1 | 5/2002 | Ferris et al. | |
| 6,438,970 B1 * | 8/2002 | Ferris | C09K 3/12 62/114 |
| 6,457,606 B1 | 10/2002 | Burke | |
| 6,698,235 B2 | 3/2004 | Nobuta et al. | |
| 6,722,141 B2 | 4/2004 | Ferris et al. | |
| 6,807,976 B2 | 10/2004 | Knowles | |
| 6,810,714 B2 | 11/2004 | Anderson | |
| 6,851,442 B2 | 2/2005 | Knowles et al. | |
| 6,938,651 B1 | 9/2005 | Carter et al. | |
| 2002/0026800 A1 * | 3/2002 | Kasai | F25B 13/00 62/85 |
| 2002/0124578 A1 * | 9/2002 | Ferris | C09K 3/12 62/77 |
| 2002/0127161 A1 * | 9/2002 | Sgarbi | C09K 5/041 422/198 |
| 2002/0189265 A1 * | 12/2002 | Ferris | C09K 3/12 62/77 |
| 2005/0208187 A1 | 9/2005 | Kowalski | |
| 2005/0268642 A1 | 12/2005 | Appler et al. | |

OTHER PUBLICATIONS

International Search Report for PCT/CA2005/000846 dated Oct. 3, 2005.
Written Opinion of the International Search Authority for PCT/CA2005/000846 dated Oct. 3, 2005.
International Search Report for PCT/US2002/06597 dated Jul. 15, 2002.
International Search Report for PCT/CA2009/001264 dated Dec. 23, 2009.
Written Opinion of the International Search Authority for PCT/CA2009/001264 dated Dec. 23, 2009.
Supplementary European Search Report for European Patent Application No. 05 74 9144 with a mailing date of Oct. 15, 2012.
Office Action for Canadian Patent Application No. 2,799,498 with a mailing date of Mar. 18, 2014.
International Preliminary Report on Patentability for International Application No. PCT/CA2009/001264, which was issued on Mar. 15, 2011.

* cited by examiner

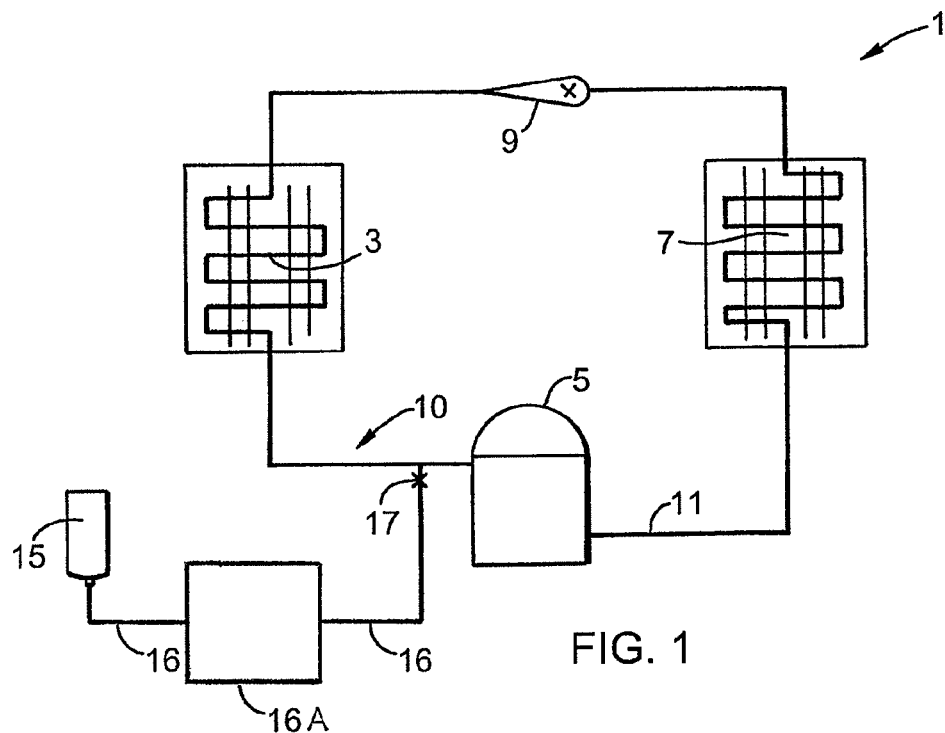
FIG. 1
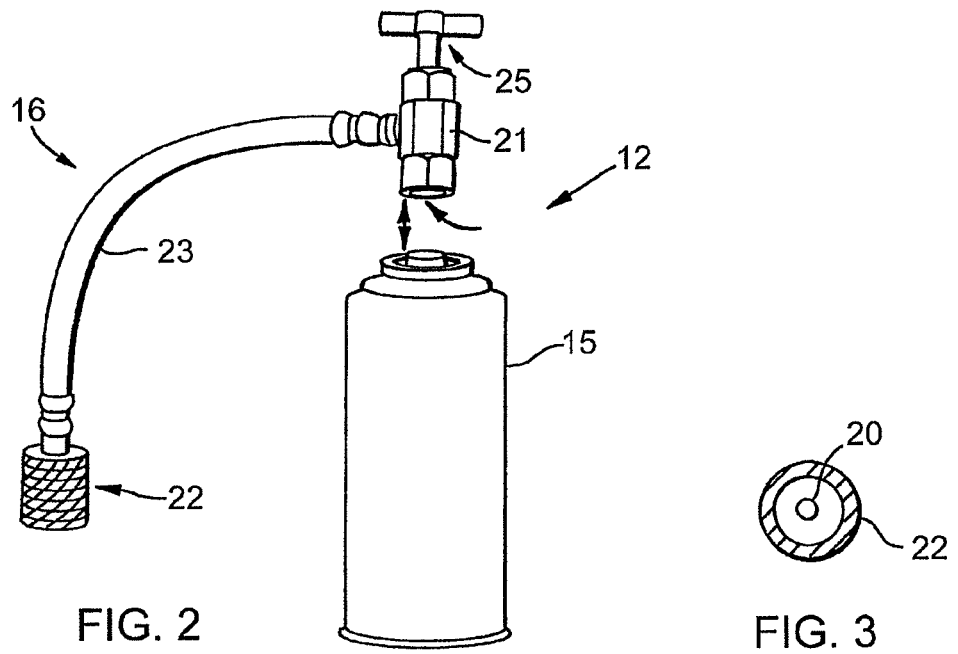
FIG. 2
FIG. 3

COMPOSITIONS AND METHODS FOR INJECTION OF SEALANTS AND/OR DRYING AGENTS INTO AIR CONDITIONING AND REFRIGERATION SYSTEMS

CROSS-REFERENCE TO RELATED APPLICATIONS

This application is a continuation of U.S. patent application Ser. No. 13/046,488, filed Mar. 11, 2011, which is a continuation of International Application No. PCT/CA2009/001264, filed Sep. 11, 2009, which is a continuation-in-part of U.S. patent application Ser. No. 11/941,364, filed Nov. 16, 2007, now U.S. Pat. No. 8,065,884, issued Nov. 29, 2011, which is a continuation of U.S. patent application Ser. No. 10/860,646, filed Jun. 4, 2004, now U.S. Pat. No. 7,296,423, issued Nov. 20, 2007. PCT/CA2009/001264 also claims the benefit of U.S. Patent Application No. 61/096,208, filed Sep. 11, 2008, the contents of all incorporated herein by reference.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIG. 1 is a graphic representation of a sealant injection assembly in accordance with a preferred embodiment of the present invention in use with an air conditioning or refrigeration system 1.

FIG. 2 is a partially exploded perspective view of the assembly of FIG. 1.

FIG. 3 is an end view of a fitting and orifice used in the assembly of FIG. 2.

DETAILED DESCRIPTION OF THE PREFERRED EMBODIMENT

Figure 4:
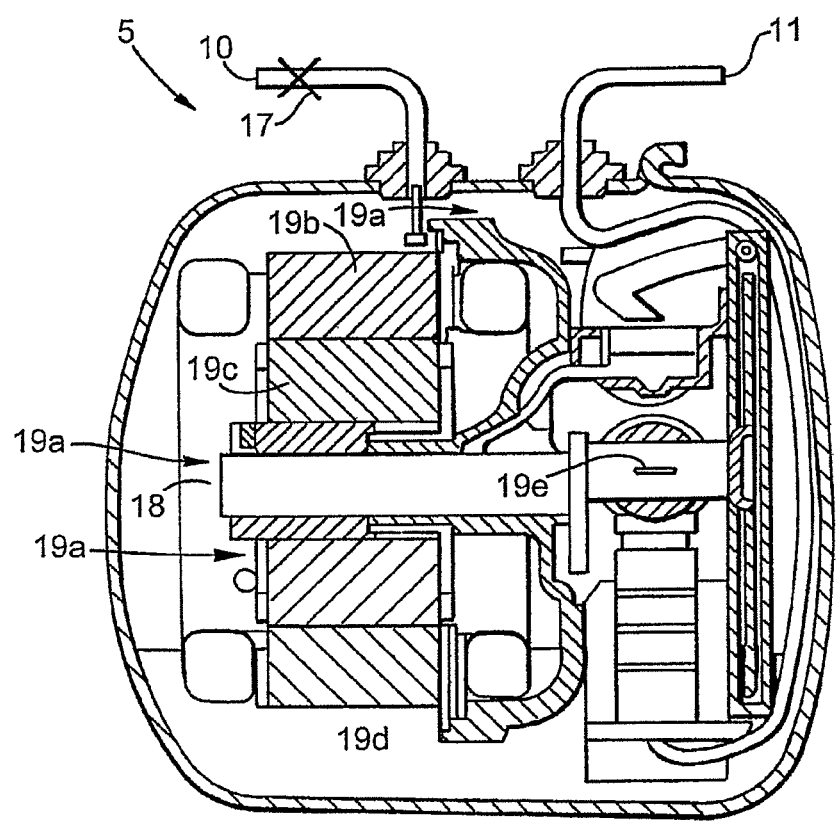
FIG. 4 is a cutaway view of a typical single cylinder hermetic compressor.

Referring to FIG. 1, a typical hermetically sealed air conditioning or refrigeration system 1 has an evaporator 3, compressor 5, condenser 7 and expansion device 9. The system 1 has a "low side" 10 consisting of the part of the system 1 between the expansion device 9 (for example, an orifice 9) and the suction line to the compressor 5. The compressor 5 draws in low pressure, low temperature refrigerant in a gaseous state from the "low side" 10. The compressor 5 compresses the gaseous refrigerant to a high pressure, high temperature gaseous state that flows to the condenser 7. The refrigerant passes through the condenser 7 and is cooled to a liquid state. The liquid refrigerant passes through the expansion valve 9, which causes the refrigerant to expand to a low pressure, low pressure temperature gas. The evaporator 3 absorbs heat from outside the system 1, and relatively low temperature, low pressure gas is reintroduced to the compressor 5.

For the test environment, the low side pressure was approx. 77 psig at the compressor 5, and pressure on the high pressure side of the compressor (the discharge 11) was approx. 256 psig. The temperature at the evaporator 3 was approx. 45° F. and at the condenser approx. 126° F. The ambient temperature was approx. 90° F. The temperature of the gas between the valve 9 and evaporator 3 was approx. 55° F. The temperature at the compressor 5 discharge 11 was approx. 171° F. The valve 9 in the test environment had a diameter of approx. 0.059 inches. The gas flow rate in the low side between the evaporator 3 and the compressor 5 was approximately 1596 ft/min. The diameter of pipe in the low side was nominal ¾ inch, while the inside diameter of pipe at the discharge was ⅜ inches. The test environment was a single phase 2 ton compressor 5.

These are typical characteristics for an air conditioning system 1 or the environment about an air conditioning system 1. For larger and smaller systems 1, the particular specifications may change. This a design choice. The particular parameters under which sealant is introduced into the system may vary accordingly.

In order to seal small leaks in the system 1 it is desirable to introduce organosilanes or other sealants into the system 1. Organosilanes cure when in the presence of moisture, such as would occur at the situs of a leak.

The use of organosilanes in non-hermetically sealed air conditioning or refrigeration systems 1 is previously known, see for example, U.S. Pat. No. 4,237,172 issued Dec. 2, 1980 to Packo, et al. under title Sealing Leaks by Polymerization of Volatilized Aminosilane Monomers; U.S. Pat. No. 4,304,805 issued Dec. 8, 1981 to Packo, et al. under title Sealing Leaks by Polymerization of Volatilized Aminosilane Monomers; U.S. Pat. No. 4,331,722 issued May 25, 1982 to Packo, et al. under title Sealing Leaks by Polymerization of Volatilized Organosilane Monomers; and U.S. Pat. No. 5,417,873 issued May 23, 1995 to Packo under title Sealant Containing Partially Hydrolized Tetraalkoxy Silane, for Air Conditioning and Refrigeration Circuits that describe mixtures for this purpose. As previously mentioned, the simple injection of an organosilane or mixture of organosilanes into a hermetically sealed system 1 will typically cause compressor 5 failure.

Referring to FIG. 2, an injection assembly 12 has a vessel 15 containing an organosilane mixture. In the preferred embodiment the vessel 15 is a canister 15. The mixture is selected for miscibility with the contents of the system 1. It is to be recognized that, in addition to refrigerant, the system 1 contains a miscible lubricant for lubrication of the compressor 5. The system 1 may also have other contents, such as a fluorescent dye for leak detection. It may also contain a chemical dryer to remove moisture from the system 1.

The inventors have recognized that, in addition to liquid slugging, the introduction of greater concentrations of organosilanes remove lubricants from the compressor 5, resulting in compressor 5 failure. The organosilane should be introduced in sufficiently low concentrations and be miscible with the system 1 lubricant to avoid liquid slugging and to maintain sufficient lubricant for proper operation of the compressor 5. The organosilane is introduced from vessel 15 to a low side port 17 between the evaporator 3 and compressor 5.

The organosilane is introduced at a rate that allows the concentration of the organosilane to be diluted sufficiently by the other system 1 contents to prevent liquid slugging and to maintain sufficient concentration of lubricant for proper operation of the compressor 5.

Referring to FIG. 4, controlled injection of the organosilane combined with the miscible lubricant is critical when injected at the low side port 17 because of the close proximity between the low-side charging port 17 and compressor 5. After the organosilane/miscible lubricant mixture enters the compressor 5 along with cool refrigerant vapor it has to first pass by outboard shaft bearing 18. This aids in replacing oil to the outboard bearing which may have been stripped by passing refrigerant. The mixture continues on flow path 19a rushing over motor windings (stator 19b, rotor 19c) removing heat from the electric motor. The flow of refrigerant vapor/mixture is then drawn over oil reservoir (sump) 19d into compressor pump 19e where it is compressed into a hot vapor and discharged. During this flow path the importance of maintaining a suitable viscosity is important for a continued oil barrier between metal internals.

Many refrigeration and air conditioning systems use semi-hermetic or open seal (external drive) compressors and the type of compressor may be reciprocating (piston-cylinder), rotary, scroll, screw or centrifugal. While compressor geometry is critical to the hermetic systems as explained above, general engineering considerations also require control of flow rate, quantity and viscosity of the injected material for the other drives to ensure continued good operation and acceptable compressor life.

The organosilane can be introduced by many different methods. For example, it can be injected at a very slow rate while the compressor 5 is running continuously. This requires fine control over the injection rate. In order to allow increased rate of introduction, the organosilanes (or a portion thereof) can be injected into a running system 1, followed by a period of time during which the system 1 is stopped. The initial use of a running system 1 allows the organosilane to be distributed through the system 1. Stopping the system 1 allows the distributed organosilanes to further mix with the system 1 contents, without forcing areas of high organosilane concentration to flow through the compressor 5 repeatedly. This process can be repeated until all of the organosilane is introduced. Although this may allow for greater rates of introduction, the process would still be slow, and fine control is still required.

An alternative method of introducing the organosilane is to form an organosilane mixture by pre-diluting the organosilane in a material miscible with the system 1 contents and with the organosilane. This mixture is then introduced into the system 1 using one of the methods discussed above.

In the preferred embodiment, the organosilane is mixed with a lubricant to form the organosilane mixture. This has an additional benefit of maintaining lubricant in close proximity to the organosilane at all times. For increased flow control the viscosity of the organosilane mixture can be maintained within a selected range. Organosilane on its own has a very low viscosity (for example <1 cst. at 40° C.). This in part results in difficulty in controlling the flow of organosilane.

An additional method of injection would include the use of a fluid injector that can inject the mixture into the working low side system of the unit in small increments, an example include a Revolver™ sold by Cliplight Manufacturing Company of Toronto, Canada. The Cliplight device allows for approximately 0.04 of an ounce to be measured in at any one time. Additional amounts of the mixture depending on the system size could be accurately added. This would be an acceptable method of injection allowing only small amounts of the mixture into the suction gas path and thus preventing possible liquid slugging to the compressor 5.

Also, there are other modifications that could be made to an injection device. For example, a filter 16A could be added, as shown in FIG. 1, to the hose apparatus 16 to filter out any particles injected from the system 1 when charging the canister 15.

Further details of the preferred embodiment will be described.

Referring to the FIGS., the use of sealants based on organosilanes for refrigeration and air conditioning systems 1 is made possible by control of the rate of introduction and viscosity of the sealant mixture within certain ranges. An appropriate choice of organosilane sealant is made to allow effective sealing of small pinhole size leaks in the air conditioning or refrigeration system 1.

Preferably, the organosilane is chosen with several criteria in mind. The organosilane is miscible in the lubricant fluid; it is typically a monomer, but may contain oligomers, capable of forming a solid polymer with itself or other chosen organosilanes in the presence of moisture under the conditions of the particular application. The reaction rate of the organosilane or mixture of organosilanes is sufficient to form an effective seal at the situs of the leak. The polymeric seal is chosen to be sufficiently strong to maintain an effective barrier to prevent further leakage of refrigerant from the system 1. Also, the organosilanes are chosen to be stable in the absence of moisture, be non-corrosive and otherwise inactive to the components of system 1 and be generally environmentally acceptable. Further, the nature and injected quantity of the organosilanes is chosen, to the extent that it would interfere with the refrigerant and/or lubricant, so that such interference remains consistent with the normal operation of the refrigerant fluid e.g., vaporization and liquefaction characteristics.

The organosilane is combined with a miscible lubricant at particular ratios to provide the proper mixture viscosity for injection to the refrigerant system 1 to prevent bearing seizure. Specific orifice 20 (see FIG. 3) sizes are selected for an apparatus to ensure that the mixture is injected at flow rates required to prevent liquid slugging and subsequent compressor 5 shutdown or failure. In addition, certain procedures are performed for effective introduction of the mixture. Injection procedures are also described that reduce risk of temporary or catastrophic equipment shutdown. These include allowing the sealant mixture to cool to ambient temperatures before injection. Cooling permits better control over the flow rate of the organosilane component of the mixture.

Preferred components and compositions for the organosilane include those described in U.S. Pat. No. 4,237,172 issued Dec. 2, 1980 to Packo, et al. under title Sealing Leaks by Polymerization of Volatilized Aminosilane Monomers; U.S. Pat. No. 4,304,805 issued Dec. 8, 1981 to Packo, et al. under title Sealing Leaks by Polmerization of Volatilized Aminosilane Monomers; U.S. Pat. No. 4,331,722 issued May 25, 1982 to Packo, et al. under title Sealing Leaks by Polymerization of Volatilized Organosilane Monomers; and U.S. Pat. No. 5,417,873 issued May 23, 1995 to Packo under title Sealant Containing Partially Hydrolized Tetraalkoxy Silane, for Air Conditioning and Refrigeration Circuits.

Particular compositions for the organosilane are dependent on the selected criteria from those set out above. However the general nature of the organosilane can be represented as $(R_1)(R_2)Si(R_3)(R_4)$ where the preferred nature of the radicals is that $R_1$ is an alkyl radical of 1-4 carbon atoms or vinyl or —OH $R_2$ is $R_1$ or —$OR_1$ or —$NH(R_1)$ or —$N(R_1)_2$ or —$R_1NHR_1NH_2$ $R_3$ is $R_1$ or —$OR_1$ or —$NH(R_1)$ or —$N(R_1)_2$ or —$R_1NHR_1NH_2$ $R_4$ is $R_1$ or —$OR_1$ or —$NH(R_1)$ or —$N(R_1)_2$ or —$R_1NHR_1NH_2$.

Other components which can be included are oligomers of the monomeric silanes described. One such example are the siloxanes:

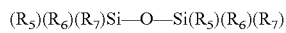

where $R_5, R_6$ or $R_7$ may be $R_1, R_2, R_3$ or $R_4$.

This composition was present at about 10% in the organosilane mixture used for experimental purposes where $R_5$ and $R_6$ were —$OCH_3$ and $R_7$ was either —$CH_3$ or vinyl.

These compositions are illustrative only as indicated by the patents cited for Packo, et al. It is also recognized that not all silanes or combinations will meet each or all of the criteria set out of above.

The lubricant is preferably chosen to be miscible with the organosilane mixture at ambient temperatures to provide proper control of the flow. Preferred lubricants would include those based on fluids such as polyesters. Lubricants based on other fluids might be used. Those known to be miscible with organosilanes include, for example, mineral oils, alkyl benzenes and polyalkylene glycols.

Other fluids as alternatives to the lubricant or in combination with the lubricant may also be used provided that they result in an appropriate viscosity for the mixture and are compatible with contents of the system 1. In those other systems where the refrigerant is not a carrier for the lubricant, i.e., systems with separate refrigerant and lubrication circuits, these other fluids may also be added. The restrictions outlined elsewhere herein for high-side injection to a 6 vol % max per minute based on oil capacity also apply. These other fluids include, for example, drying agents, elastomer and metal conditioners, antioxidants, corrosion and rust inhibitors, antiwear agents, metal deactivators, acid and base neutralizers, detergents, fluorescent and phosphorescent dyes and such.

Drying agents include, for example, mono- and polyhydric alcohols, including glycols, preferentially mono-, di- and trihydric alcohols, or orthoesters such as orthoformates. While orthoformates are commonly referred to as drying agents, their mode of action is considerably different than that of the alcohols. Alcohols actually form solutions with water so that the water is still present in the system. In the case of materials such as orthoformates or other orthoesters, the water actually takes part in a chemical reaction which transforms the water into other molecular species. Chemicals that react with water in this manner are termed hydrolytes. In the case of orthoesters and other desirable hydrolytic drying agents used in the present invention, the hydrolytic reaction with water forms a fluid that is oil-soluble. Hydrolytes used as drying agents are referred to herein as "hydrolytic drying agents". Examples of hydrolytic drying agents that form (or continue to be) an oil-soluble fluid upon reaction with water include orthoesters (including orthoformates), acetals, epoxides, and carbodiimides.

Conditioners include, for example, methylene chloride and cyclohexanone. Antioxidants include, for example, those based on phenolic and aminic derivatives. Corrosion and rust inhibitors include, for example, esters of derivatives from succinic acid. Antiwear agents include, for example, sulphur and phosphorus derivatives. Metal deactivators include, for example, triazole derivatives. Acid and base neutralizers include, for example, buffering agents. Detergent additives include, for example, non-ionic detergents.

Other sealants, alternative to or in combination with organosilanes, may also be used. These sealants may consist of polymeric latexes, vinyl acetates, acrylonitriles, epoxide or methacrylates or some combination thereof. The sealant may include alkylene glycol. The sealant may contain a catalyst or accelerator. The catalyst may contain a copper or cobalt compound. The catalyst or accelerator may contain a solubilizer. The sealant may contain a filler. The filler may be graphite, carbon powder or a polytetrafluoroethylene.

Preferred compositions of the lubricant/organosilane mixture, or the lubricant/hydrolytic drying agent mixture, or the lubricant/organosilane/hydrolytic drying agent mixture are those providing viscosities above a viscosity of 7 cst. when measured at 40° C. The choice of this viscosity minimum was determined by experiment as illustrated below in examples 4 to 7. The 40° C. measurement point is used simply because this is the temperature at which compressor lubricants are typically characterized for viscosity.

The quantity of organosilane to be added depends on the size of the refrigeration or air conditioning system. This is not due to the size or number leaks in the system. For small leaks, say less than 1/16" in diameter, and a sealant plug 1/16" long, several hundred seals would easily require only an ounce of organosilane. The rapidity with which a leak will seal depends on delivering an effective quantity of the sealant to the situs of the leak. This latter consideration, experience in automotive applications, and general practical considerations such as the size of the injection apparatus, suggest that injections of between 1/8 and 1 oz. of organosilanes are sufficient for most applications, with larger systems requiring the larger amount. In addition, it has been found that injections up to a maximum of 10% of the lubricant quantity in the system are recommended due to concerns with injection of liquid into the low side in proximity to the compressor 5.

In the preferred embodiment, organosilane is combined with a miscible lubricant. The quantity of lubricant mixed with the organosilane is determined by considerations of first, providing adequate lubrication as the fluid enters the compressor 5 as has been previously described and second, of producing limited effect on the final lubricant viscosity, preferably no more than 10% reduction, once the organosilane has been distributed throughout the system.

The desired viscosity of the lubricant/organosilane mixture can be achieved by varying the ratio of the two or by adjusting the viscosity of the lubricant. Organosilanes of interest generally have very low viscosities (<1 cst. @ 40 C) while lubricants of interest are much higher in viscosity (10 to 220 cst. or more @ 40 C). The effect of the injected mixture on the final lubricant mixture depends on the injected viscosity as well as both the viscosity and quantity of oil in the system. Table 1 provides information on the range of characteristics of typical refrigeration and air conditioning systems. As described previously, the systems in Table 1 cover the range of compressor drives and types. The methods and considerations outlined in herein apply to all such systems.

TABLE 1

CHARACTERISTICS OF TYPICAL REFRIGERATION AND AIR CONDITIONING SYSTEMS

| SYSTEM CAPACITY (TON/HR.)* | TYPICAL APPLICATION | SUMP CAPACITY (OZ.) | OIL VISCOSITY RECOMMENDATION (CST. @ 40 C.) |
|---|---|---|---|
| 300-18,000 BTU/hr | Residential Commercial refrigeration, air conditioning | 10-30 | 10-32 |

TABLE 1-continued

CHARACTERISTICS OF TYPICAL REFRIGERATION AND AIR CONDITIONING SYSTEMS

| SYSTEM CAPACITY (TON/HR.)* | TYPICAL APPLI-CATION | SUMP CAPACITY (OZ.) | OIL VISCOSITY RECOMMENDATION (CST. @ 40 C.) |
|---|---|---|---|
| 18,000-60,000 BTU/hr | Residential Commercial refrigeration, air conditioning | 30-65 | 32, 46 |
| 60,000 BTU/hr (5 ton)-25 | Commercial, industrial refrigeration an air conditioning | 65-512 | 32, 46, 68 |
| 25+ | Industrial applications | 65-900 and greater | 46, 68 up to 220 |

*1 ton represents approximately 12,000 BTU

Given the wide range of possibilities represented in Table 1, the effect of various injected lubricant viscosities, lubricant/organosilane ratios, oil sump 19d size and oil sump viscosity was evaluated by calculation of these factors. This process guides selection of the preferred viscosity and quantity of the injected mixture. The following serves to illustrate the process only.

The viscosity of a binary mixture of similar materials is often related to the viscosity of the components by the relation:

$$\ln \eta_{mix} = x_1 \cdot \ln \eta_1 + x_2 \cdot \ln \eta_2 + C \quad \text{(Equation 1)}$$

where: ln is the natural logarithm
$\eta_{mix}$ is the viscosity of the mixture
$\eta_1$, $\eta_2$ are the viscosities of components 1 and 2 and
$x_1$ and $x_2$ are the corresponding mole fractions
C is a constant dependent on the nature of the components.

This equation has been found to predict the viscosity of organosilane/lubricant mixtures quite well for the current application. A similar relationship can be written for multi-component mixtures as well as for calculation of densities.

With component 1 taken as the injected material and component 2 as the original sump oil, Equation 1 can be rearranged to give the final viscosity of the mixture as:

$$\eta_{final} = \exp(x_{inj} \cdot \ln \eta_{inj} + x_{sump} \cdot \ln \eta_{sump} + C) \quad \text{(Equation 2)}$$

where $\eta_{final}$ is the final viscosity of the sump mixture after injection of the sealant mixture ln is the natural logarithm and exp is the exponential
$x_{inj}$ is the mole fraction of injected material in the final sump mixture
$x_{sump}$ is the mole fraction of the original sump oil in the final sump mixture
$\eta_{inj}$, $\eta_{sump}$ are the viscosities of the injected material and original sump oil respectively
and C is a constant dependent on the nature of the components.

With the limit that the final sump viscosity should not be lowered more than 10% compared to the original sump viscosity, then based on Equation 2, this amounts to a requirement that:

$$\exp(x_{inj} \cdot \ln \eta_{inj} + x_{sump} \cdot \ln \eta_{sump} + C) \leq 0.9 \, \eta_{sump} \quad \text{(Equation 3)}$$

Since the mole fraction of any component depends on the weight percent present for that component, then Equation 3 provides a basis for determining the desired viscosity and quantity limits on the injected material.

Of course, Equation 3 can be adjusted based on any selected limit on final viscosity other than the 90% of original sump viscosity used here.

$$\exp(x_{inj} \cdot \ln \eta_{inj} + x_{sump} \cdot \ln \eta_{sump} + C) \geq Fr \cdot \eta_{sump} \quad \text{(Equation 4)}$$

where Fr is the desired fraction of the original sump oil viscosity to be maintained.

Examples of these predicted effects using Equation 2 are shown for various situations in Table 2.

TABLE 2

VISCOSITY EFFECTS OF LUBRICANT/ORGANOSILANE MIXTURES ON REFRIGERATION SYSTEMS

| | 1 Lubricant Viscosity in system (cst. @ 40 C.) | 2 Lubricant Viscosity injected (cst. @ 40 C.) | 3 System Oil Capacity (oz.) | 4 Volume Injected (oz.) | 5 Viscosity of Lube/Organosilane Injected (cst. @ 40 C.) | 6 Weight % Lubricant Injected | 7 Weight % Organosilane Injected | 8 Final Oil Sump Viscosity (cst. @ 40 C.) |
|---|---|---|---|---|---|---|---|---|
| 1 | 32 | — | 10 | 1 | 0.6 | 0 | 100 | 18.7 |
| 2 | 10 | 32 | 10 | 1 | 10 | 76 | 24 | 9.9 |
| 3 | 32 | 32 | 10 | 1 | 15.6 | 87.5 | 12.5 | 29.9 |
| 4 | 32 | 32 | 30 | 1 | 10 | 79 | 21 | 30.7 |
| 5 | 32 | 32 | 30 | 1 | 7 | 71 | 29 | 30.2 |
| 8 | 32 | 32 | 50 | 1 | 10 | 79 | 21 | 31.2 |
| 9 | 32 | 32 | 50 | 2 | 10 | 79 | 21 | 30.4 |
| 10 | 32 | 32 | 50 | 3 | 10 | 79 | 21 | 29.7 |
| 11 | 46 | 32 | 65 | 3 | 10 | 79 | 21 | 42.2 |
| 12 | 68 | 32 | 512 | 3 | 10 | 79 | 21 | 66.9 |

As seen in row 1 of Table 2, the injection of 1 oz. of these particular organosilanes causes a drop in viscosity in a 10 oz. sump from 32 to below 19 cst. (all viscosities will refer to 40° C.). A maximum drop in sump viscosity of about 10% is generally acceptable, corresponding to 29 cst. limit for units designed for 32 cst. viscosity oils. In such small systems, our testing indicates that this low viscosity material would likely cause bearing seizure. Rows 2 and 3 of Table 2 show that injection of organosilane blends with a 32 cst lubricant can provide satisfactory results. In row 2, it is indicated that 1 ounce of a mixture containing about ¼ ounce of an organosilane and ¾ ounce of a POE lubricant having a viscosity of 32 cst. at 40 C combine to form a mixed viscosity of 10 cst. When this is injected into a system containing 10 ounces of a lubricant having a viscosity of 10 cst. at 40 C, the resultant sump viscosity of the mixture is expected to be just below 10 cst., at about 9.9 cst. at 40 C.

This result is due to the effect of the molar fraction term in equation 1. Line 3 similarly shows that injecting ⅛ of an ounce of organosilane in 1 ounce of the lubricant/organosilane mix into such a system using a 32 cst. lubricant rather than the 10 cst. mix of Line 2 would produce a sump viscosity of 29.9 cst. This is above the suggested 29 cst. limit for this lubricant and would be an acceptable formulation. Rows 4 and 5 show information for systems using a 32 cst. lubricant and having a sump capacity of 30 ounces. Up to about ⅕ of an ounce of organosilane can be injected while still maintaining an injected viscosity of at least 7 cst. Rows 8, 9, and 10 indicate the diminishing effect of larger sump size with various injections compared to the previous rows, allowing up to ⅗ of an ounce of organosilane to be injected while still maintaining final viscosity above 29 cst. Rows 11 and 12 give information for systems using 46 or 68 cst. lubricants in the sump.

An example of the use of this computational technique is the determination of acceptable combinations, ratios and amounts of lubricant and organosilane to be injected by consideration of the system characteristics exhibited in Table 1. For example if a small unit with a 10 oz. sump contains 32 cst. lubricant, what should be the composition of the injected material using a 32 cst. lubricant and an organosilane mix? With 1 ounce injected, the maximum amount of organosilanes used here is calculated to be 0.175 of an ounce with the injected mixture having a viscosity of 12 cst. and the system lubricant having a final viscosity of 29 cst. At the minimum injected viscosity of 7 cst., then 0.6 ounces of a mixture containing 28.7% organosilanes could be added to the 29 cst. final viscosity, representing 0.172 ounces which is slightly lower.

Table 3 gives examples of situations where the viscosity limit of lubricant (32 cst)/organosilane mix needs to be controlled above the minimum viscosity requirement of 7 cst. dependent on the total amount injected. For example, to maintain a 10 oz. system containing 32 cst. lubricant above 29 cst. after addition of 1 oz. of mixture, then the lubricant/organosilane mixture should be at a minimum viscosity of 12 cst. at 40 C which correspond to less than 0.175 oz. of organosilane in the 1 oz. of material injected. In the case of injecting 3 ounces of this lubricant/organosilane mix into a system containing 30 oz. of 32 cst. lubricant, then a similar minimum viscosity holds. The minimum viscosity for a larger system with 65 oz. of 46 cst. oil is limited to a maximum of 0.81 oz organosilanes when the total charge is 3 oz. in order to keep final viscosity above 41.4 cst. With the 65 oz. sump size, a unit using 68 cst. oil would be limited to a minimum viscosity injected of 17 cst. corresponding to just over ½ oz of silane in a 3 oz. total charge to maintain final viscosity above 61.2 cst. Dropping the injected charge to 2 oz. actually yields little benefit in organosilane injected in this case and also has a much lower injected viscosity for the injected material at the minimum injected viscosity.

TABLE 3

DEPENDENCY OF INJECTED VISCOSITY ON REFRIGERATION AND AIR CONDITIONING SYSTEMS

| Sump size (oz.) | Lubricant Grade in Sump | Injected Amount (oz)* | Minimum Viscosity Injected** (cst. at 40 C.) | Maximum organosilane injected (oz) |
|---|---|---|---|---|
| 10 | 32 | 1 | 12 | 0.175 |
| 30 | 32 | 3 | 12 | 0.525 |
| 65 | 46 | 3 | 8.2 | 0.81 |

TABLE 3-continued

DEPENDENCY OF INJECTED VISCOSITY ON REFRIGERATION AND AIR CONDITIONING SYSTEMS

| Sump size (oz.) | Lubricant Grade in Sump | Injected Amount (oz)* | Minimum Viscosity Injected** (cst. at 40 C.) | Maximum organosilane injected (oz) |
|---|---|---|---|---|
| 65 | 68 | 3 | 17 | 0.51 |
| 65 | 68 | 2 | 7.6 | 0.6 |

*lubricant of 32 cst. at 40 C. combined with organosilanes
**to 90% viscosity limit in sump viscosity It is not required that the viscosity of the injected lubricant be the same as the lubricating oils in the system, only that there be effective injection of the sealant and non-deleterious longer term effects. The effect of increasing the viscosity of the injected mixture using higher lubricant viscosity, however, is relatively small as seen in Table 4 which shows the effect of introducing an organosilane/polyolester (POE) lubricant mix into a unit designed to operate with a lubricant at 32 cst.

TABLE 4

EFFECT OF VARYING LUBRICANT VISCOSITY OF INJECTED ORGANOSILANE MIXTURE INTO SYSTEM USING 32 CST. POE LUBRICANT*

| | POE Viscosity (cst@40 C.) | Wt. % POE | Wt. % Organosilane | Viscosity Injected Mixture (cst@40 C.) | Final System Viscosity (cst. @ 40 C.) |
|---|---|---|---|---|---|
| 1 | 32 | 79 | 21 | 10 | 28.5 |
| 2 | 46 | 79 | 21 | 13 | 29.0 |
| 3 | 68 | 79 | 21 | 17 | 29.6 |

*10 oz. sump capacity, 1 oz. injected

The application of Equations 1-4 allows calculation of acceptable mixtures of lubricant and organosilane to be used for any specific situation in terms of the size of the unit (oil capacity) and viscosity of the sump oil. The minimum ratio of lubricant to organosilane is predetermined by the minimum allowable injected viscosity and the individual viscosities of the lubricant and organosilane in the injected mixture. The viscosity of mixtures relate exponentially to component viscosities and in ratios dependent on mole fractions rather than simple weight fractions. In addition, it is recognized that the molecular nature of the lubricant affects the relation between viscosity and molecular weight so that the examples presented here are not to be taken as representing the only possible trends.

These examples demonstrate that the application of the techniques described herein is not limited to fluids of a particular viscosity except as related to effective injection and longer term operation of the system particularly as related to the compressor.

Some systems operate with a lubricating subsystem that is independent of the refrigerant. In this case, organosilanes alone are injected into the refrigerant circuit.

It is also possible to inject organosilanes alone in systems where the lubricant is carried by a miscible refrigerant. In this case, the organosilane alone, or in a mix with lubricant, can be injected into the high side of a refrigeration system while the unit is operating up to a maximum of 6% per minute of the systems total oil content. For example, a system with a 50 oz oil capacity could be injected up to a rate of 3 oz/min. of organosilanes. The quantity injected remains limited by the foregoing based on limits to reduction in sump viscosity. After 6% is exceeded, there will be a decreased level of compressor performance due to higher discharge temperature resulting in possible decreased oil return to the low side of compressor eventually damaging the shaft bearings. Injecting at a rate above 8% per minute of the total oil system's content will likely result in loss of effective heat transfer, decreased bearing lubrication and possible catastrophic compressor failure. It is recognized that the 6% and 8% amounts are for typical systems and there are likely systems that can exceed these thresholds while falling within the principles described herein.

These methods can be utilized regardless of the class of compressor.

In the preferred embodiment, injection of the lubricant/organosilane mixture is accomplished through the use of a sealed canister 15 and a coupling hose assembly 16 that is first fitted to the canister 15 and then to the inactive refrigeration system 1 through an injection port 17 on the low-pressure side of the compressor 5.

The canister 15 can be pressurized before the canister 15 is sealed. The pressure in the canister 15 causes the sealant mixture to enter the system 1 when the canister is opened, there is fluid connection to the system 1, and the system 1 is running to cause "low side" 10 pressures to drop. In test environment the canister 15 was not pre-pressurized as will be explained below; however, a charged pressure of 100 psig was found to be acceptable for allowing the sealant mixture to enter the system 1 in the test environment, where the low side pressure was 77 psig as mentioned previously.

Alternatively, the sealed canister 15 can have a pressure near, at or below ambient. The canister 15 can be charged (pressurized) using the system 1 pressure. First the system 1 is turned off and pressure within the system 1 is allowed to equalize. In the test environment, this results in an overall system 1 pressure of approximately 100 psig. The canister 15 is then placed in fluid connection with the system 1. This causes the canister 15 to be pressurized to approximately 100 psig. The system 1 can then be run. This causes the pressure in the low side 10 to drop. The higher pressure within the canister 15 causes the sealant mixture to enter the system 1.

Using a non-pressurized canister 15 as described above is preferred as such containers are less hazardous. This means, for example, that they are transportable without having to comply with the strict transportation regulations applicable to pressurized containers.

More details of a preferred method used in the test environment will now be described. Before use, the canister 15 is at a pressure of about 20 inches of mercury vacuum. The vacuum is a result of packaging processes that ensure much of the air is removed from the canister 15 before it is sealed. Hose assembly 16 is evacuated and then the canister 15 seal is broken using a can-tapper 21 that is built into the hose assembly 16 in such a way that refrigerant mix from the system 1 is allowed into the canister 15 until pressures are stabilized, and the canister 15 is charged. The can-tapper 21 has a manually operated valve (see valve handle 25 below) for fluid connection (open) and fluid disconnection (closed) of the canister 15 from the system 1. It also has a tapping pin (operation described below) for unsealing the canister 15 (which is also required for fluid connection when the canister 15 is sealed). The can-tapper 21 is also a fitting for sealed fluid connection to the canister 15, typically by way of compatible threads in the can-tapper and on the canister 15, and corresponding seals, such as a rubber gasket or an o-ring.

The addition of canister 15 contents to the refrigerant system 1 is controlled to a maximum flow rate of about 6 cc/sec which in the preferred embodiment is obtained through the use of orifice 20 having a maximum diameter of about 0.06 in. One such arrangement is shown in FIG. 2. Although there is no minimum flow rate required, the minimum orifice size should be about 0.02 inches in diameter to avoid orifice plugging due to contamination from particles from system 1 as the canister 15 is charged. This minimum restriction could be removed by the inclusion of a filter, such as filter 16A of FIG. 1, in the injection hose between the fitting 22 and the injection port 17.

The orifice 20 is located within fitting 22 of FIG. 2. In the test environment an orifice of 0.0292 inches diameter was successful. The hose assembly 16 has a hose 23 between the can-tapper 21 and the fitting 22.

Surprisingly, it has been found that the action of filling the canister 15 with refrigerant upon tapping the canister 15 and opening a valve in the tapper 21 causes the canister 15 and its contents to heat to temperatures well above ambient. Temperatures of 135° F. were encountered in tests. This may affect the flow rate of the organosilane as it enters the system 1. In the preferred embodiment, the canister 15 is fluidly disconnected after charging and the system 1 is run. Then the canister 15 is again fluidly connected to the system 1. This allows the system 1 to achieve full low side 10 pressure that will best allow the sealant mixture to enter the system 1.

As there is a period of time between disconnecting and re-connecting the canister 15, the canister 15 should be allowed to cool to at or near ambient temperature while still fluidly connected to the non-running system 1. If not, then charge in the canister 15 may be lost as pressure will drop with the temperature in a closed canister 15.

Also, the contents of the canister 15 should enter the cooler suction gas stream with as close to ambient temperature of the system 1 as possible so as not to effect the volume of the cooler gas going to the compressor 5. A compressor 5 generally requires at least a four percent return of oil to maintain adequate lubrication on metal-to-metal surfaces. In practical terms, a residential system 1 operating at a suction pressure of 70 psig will typically have a corresponding evaporator 3 saturation temperature of 41 degrees F. If the system 1 is operating satisfactorily then the actual suction line 10 temperature should be approximately 51 degrees F. This is due to an extra 10 degrees of superheat picked up during the expansion. Elevating this temperature momentarily could cause an erratic expansion of gas followed by contraction resulting in a cavitation effect on the compressor 5. Experiments show a fluctuation in low-side and high-side pressures when the product has not been sufficiently cooled. Rapid changes of pressure can damage compressor valves and discharge excess oil from the compressor sump into the high-side line. This excess oil will begin to log and affect downstream conditions such as temporary high discharge pressures accompanied by temporary low-side pressure. The percentage of required oil to be carried back could lower to the point of not supplying adequate lubrication to metal-to-metal contact causing damage to the compressor 5.

These and other steps in the procedure of the preferred embodiment are described in Table 5.

TABLE 5

1. Turn off A/C system 1 and allow enough time for refrigerant to equalize in system 1.
2. Confirm that can-tapper 21 piercing pin is fully retracted below seating washer. (Turn valve handle 25 counter-clockwise, opening the valve in the tapper 21.)

TABLE 5-continued

3. Thread canister 15 onto can-tapper 21 by turning clockwise. Be careful not to cross thread or over tighten.
4. Thread female fitting 22 onto vacuum pump, not shown, and draw vacuum for approximately 1 minute to eliminate air in tap hose 5.
5. Remove female fitting 22 from vacuum pump while it is running to maintain vacuum in tap hose 5. After disconnecting shut down vacuum pump.
6. Thread female fitting 22 onto low side service port 17 immediately after removing from vacuum pump.
7. Turn can-tapper 21 piercing handle 25 clockwise until it stops. (This action pierces the can, and closes the valve in the can-tapper 21.)
8. Hold canister 15 upside down and above the low side service port 17.
   Turn handle 25 counter-clockwise (open the can-tapper valve and provided fluid connection between the canister 15 and the system 1) slowly allowing the system 1 refrigerant to fully charge canister 15. The canister 15 will become warm once the refrigerant mixes with its
   contents. Allow the canister 15 to dissipate the additional heat of charging which should take between 5 to 10 minutes depending on system 1 charge and ambient air conditions. When the can's temperature has equalized with ambient air conditions then proceed with next step. Be sure to check that all connections from canister 15
   to system 1 are secure and that there is no leakage occurring. The primary reason for inverting the canister is to simplify the procedure for the technician. If the technician forgets to invert the canister before injection into the air-conditioning unit (see 10. below) then the transfer of the mixture would not be successful because of the gas on top and the heavier liquid residing on the bottom of the can. The connection to the low-side charging port is made with the canister inverted for charging and injection as one-step. This also limits stressing the hose assembly by changing position while under pressure. Having the gas first pass through the mixture also helps to mix the contents of the mixture if possible stratification occurred between the organosilane and the miscible lubricant.
9. Turn handle 25 clockwise until it stops, isolating charged canister 15 from A/C or R system 1.
10. While holding the canister 15 upside down turn on A/C system 1. Slowly turn handle 25 counter-clockwise gradually releasing sealant into the system 1. This should take approximately 3 to 5 minutes.
Releasing sealant too quickly could result in liquid slugging. Shake canister 15 gently to determine when empty. If all of the contents in canister 15 are not emptied after 5 minutes then turn canister 15 tapper 21 piercing handle 25 clockwise until it stops. Turn of A/C or R system 1 and repeat steps 8, 9 and 10.
11. Once canister 15 is empty remove female fitting 22 from low side service port 17, then shut down A/C system 1. Allow system 1 pressure to equalize. The A/C or R system 1 should be left off for approx. 5 minutes. This procedure allows product to mix with systems 1 oil and when the system 1 is restarted will allow for equal distribution throughout system 1.

In typical experiments performed during the course of the current development, a canister was used with approximate dimensions of 5 cm. diameter and 10 cm height and this contained about 89 cc (3 oz.) of a lubricant/organosilane mix. With the canister 15 filled with refrigerant and inverted at ambient conditions, this would produce a lower column of liquid about 4.5 cm. high covered with a gaseous column of refrigerant 5.5 cm. in height. The pressure exerted by the refrigerant was around 120 psi and this was then injected into a system operating at 66 psi. Thus the driving force for injection of the liquid phase into the system was about 54 psi.

In an ideal situation the equation $$Q = C_d \times A \times (2 \times \Delta P/\rho)^{1/2} \quad \text{(Equation 5)}$$

could be applied where
Q is flow rate
$C_d$ is the coefficient of discharge
$\Delta P$ is the differential pressure, and
$\rho$ is the fluid density.

Experiments in transparent glass vessels showed the expected result that the liquid actually contained bubbles of refrigerant. Nevertheless, considering the ideal one-phase flow situation, equation 5 can be applied to obtain at least a model of the injection process. For an orifice of 0.029 inches in diameter, the canister was found to empty in about 90 sec. This corresponds to a coefficient of discharge of 0.37. Experiments showed that satisfactory injections could be made using orifice sizes up to about 0.060 inches. This corresponds to an initial flow rate of 6 cc/sec and a final flow rate of 4 cc/sec for the last fraction of the liquid.

Considerations of system size relate to the effect on viscosity of the lubricant in the system which tends to increase with the size of the system itself. System size is typically measured in tons—a measure if the cooling capacity of the system 1 (1 ton is equivalent to the delivery of 12,000 BTU cooling capacity per hour). General consideration of these factors provide "rules of thumb" to guide quantities of organosilane mixture to be added. For example, one scenario suggests for units above 5 tons capacity, a mixture about 7-8 cst. @ 40 C is appropriate and about 10 cst. for smaller units. The actual total quantity of lubricant/silane mix is dependent on ensuring effective delivery of sealant material to the situs of the leak. Typically, units below 1 ton should require about ⅛-¼oz. of organosilane and larger units ½-1 oz. The total quantities of the mixture will also depend on the practicality of the details of the injection system being used. The viscosity of the mixture and the quantity of organosilane can be adjusted within these general guidelines.

EXAMPLES

The principles described herein are further illustrated in the following examples, but the scope is not limited by these examples.

Test Methods

The general test apparatus is shown schematically in FIG. 2 and represents the basic components of a typical refrigeration system 1. A refrigerant gas (R-22 was used in the test environment; however, R134a and other refrigerants could also be used) is circulated by means of a hermetically sealed electric motor and compressor 5. The gas is condensed to liquid by means of a condenser 7; the liquid passes through valve 9 and then through an evaporator 3 where the liquid is regenerated to a gas accompanied by the desired cooling effect. The gas then returns to the compressor 5 for repeating cycles of the process.

Sealant and mixtures were added by the procedure represented in Table 1 to the low pressure (suction) side of the compressor 5.

Sealant

In the base case, simple injection of the organosilane sealant in the low side port 17 was shown not to be appropriate for hermetically sealed refrigerant compressor 5 systems 1.

Example 1

In a laboratory test, a 2 ton vertical hermetic single phase refrigeration system 1 with a full refrigerant load was loaded to simulate an ambient temperature above 32° C. An organosilane mixture was injected into the circuit and the compressor 5 failed after only one further hour of operation due to bearing seizure.

Example 2

In another set of tests, two 2 ton single phase piston type systems 1 were injected with a mixture of commercial organosilane and immiscible lubricating oil. Failure occurred in one system 1 after 10 minutes and after 1 hour in the second case.

Example 3

Two small 10,000 BTU packaged refrigerant systems 1 were tested. Both failed within 10 hours. Subsequent examination of these systems 1 showed that failure was due to lack of oil to the upper sleeve bearing, referred to as the compressor 5 outboard bearing.

Sealant Viscosity

The effect of sealant viscosity was investigated by varying the ratios of organosilane and lubricating oil in the sealant mixture.

Example 4

Mixtures of organosilane sealant (viscosity <1 cst@40° C.) and immiscible compressor 5 oil (viscosity 68 cst. @ 40° C.) caused bearing seizure in all five cases in Examples 1, 2, and 3.

Example 5

Use of straight organosilane mixture caused compressor 5 bearing seizure within one hour in a test with the 2 ton system 1.

Example 6

A test was performed using a 0.029 in. orifice 20 to inject a 3 fl. oz. mixture consisting of 3 parts of a commercial polyolester refrigeration compressor 5 oil and 1 part of an organosilane sealant such that the mixture had a viscosity of 8 cst. @ 40° C. The oil capacity of the single phase hermetically sealed 2 ton system 1 was 55 oz. The system 1 was injected with the organosilane/oil mixture with no change in amperage of the motor, indicating no liquid slugging. The system 1 was run successfully for 12 days until shut down deliberately.

Example 7

A test was performed similar to that described in Example 6 except that the mixture injected consisted of 2 parts of the commercial polyolester refrigeration compressor 5 oil and 1 part of the organosilane sealant to give a mixture viscosity of 11 cst. @ 40° C.

A start/stop test was run with 60 start/stops over a 3½ hr. period. This is a severe test due to the surge of electricity required to start the spinning of the rotor of the motor and also due to some initial loss of oil from the inboard bearing at each start. The test was successful with no change in operating variables and the system 1 ran for an additional 13 days with excellent operation until it was deliberately shut down.

Rate of Injection

Controlled rate of introduction of the organosilane/oil mix was investigated as a variable. The hose assembly shown in FIG. 2 was used to introduce mixtures into a 2 ton refrigeration system 1 fitted with an oversized 2½ ton condenser 7. The can-tapper 21 at one end of the hose seals and punctures a canister 15 containing the sealant. The fitting 22 at the other end is attached to the refrigeration system 1 and low-side port 17 is opened to allow the sealant mixture to enter the refrigeration system 1 through an orifice 20. The size of this orifice 20 affects the injection rate of the sealant.

Example 8

Using an orifice 20 size of 0.094 in., it was found that the rate of addition of the sealant/oil mixture caused fluctuations in suction and discharge pressure of the system 1. As previously mentioned this upset condition can cause the compressor to momentarily discharge from the sump into the discharge line causing logging possibly affecting oil return to the suction side of the compressor and eventual bearing failure. Any needle valve associated with the orifice 20 would not allow sufficient additional fine control to overcome this problem.

Example 9

A capillary tube was used to control introduction of the sealant. An orifice 20 size of 0.055 in. was found to allow successful introduction of the sealant into the above refrigeration system 1. The system 1 ran for 18 days with no change in operating variables before it was deliberately shut down.

Example 10

Inserting an orifice 20 size of 0.029 in. into the system 1 described in Example 8 was tested and found to give successful injection of organosilane/oil mixes.

Quantity of Injection

Smaller systems are of considerable concern for susceptibility to the rate and quantity of injection. The two examples below were injected with a mixture consisting of ¾ oz of polyolester lubricating oil and ¼ oz of a silane mixture having a total viscosity of 9.8 cst. at 40 C using the injection technique outlined in Table 1. In each case, the sump originally contained 10 oz. of polyalkylene glycol lubricant having a viscosity of 32 cst. at 40 C. Examples 11 and 12 below support an injection limit of up to 10 vol % of sealant mixture, bases on sump oil charge, can be injected into refrigeration or air conditioning systems. In addition, it is apparent in these examples that the refrigerant charges are extremely small (3.70 and 1.69 oz) but that the additional 10 vol % liquid has had no effect on the thermal efficiencies of the units.

Example 11

DANBY Model DCR433W
Refrigerant—134A
Charge—105 g
AMPS—1.1
Procedure: Bullet piercing valve installed
Conditions: Base of compressor—101 F to 104 F
0.87 AMPS
Suction temp—72 F
Discharge temp—101 F
Inside panel—freezer 0 to 2 F (Temperature glide effect)

Allow 3 min to fill can
5 min cool down
Allow 5 min run then switch to off
After stop time, put in operation
After 90 days, the system continued to run successfully.

Example 12

Unit: GE with Matsushita SB30C50GAU6 compressor
Refrigerant 134A
Charge 1.59 ounces
Procedure: Bullet piercing valve installed
Conditions: Base of compressor—90 F
0.88 AMPS
Suction temp—70 F
Discharge temp—102 F
Inside—panel—freezer—4 F to 5 F
Allow 3 min to fill
5 min cool down
Allow 5 min run then switch off
After stop time, put in operation
After 90 days, the system continued to run successfully.

Injection Procedures

As outlined in Table 1, the typical procedure used to inject mixtures into the refrigeration system 1 involves opening the canister 15 containing the oil/organosilane mixture to a low pressure port 17 just prior to the non-operating compressor 5. The mixture is at a pressure near 20 inches of mercury vacuum before opening to the refrigerant system 1 which is typically near 100 psig. The entry of the refrigerant into the mixture in the canister 15 causes a heating effect and raises the canister 15 and contents to about 25° C. above ambient. Single phase systems 1 are particularly susceptible to this effect since entry of the hot mixture into the refrigeration system 1 would cause momentary heating of the suction vapor and a decrease in the vapor's density. This in turn affects the ability of the vapor to cool the motor and other mechanical parts.

Therefore as part of the procedure to inject the mixture from the canister 15, it is important to allow the refrigerant/sealant mixture to cool before introduction into the refrigeration system 1.

The use of orthoformates as hydrolyte drying agents has been discussed above. Example orthoesters (including orthoformates) may be one or some of trimethylorthoformate (TMOF), trimethylorthoacetate (TMOA), triethylorthoformate (TEOF), triethylorthoacetate (TEOA). Triisopropylorthoformate (TIPOF), or triisopropylorthoacetate (TIPOA). As a further example, other orthoformates with an aryl substituent such as triethylorthobenzoate (TEOB) may be used.

Several patents have described the general application of orthoformates as drying agents for refrigeration systems or with specific refrigerant base oil compositions. U.S. Pat. No. 5,300,245 issued Apr. 5, 1994 by Sawada, et al. under title "Working Fluid Composition having Ketone-Containing Compound for Use in Refrigeration System" mentions the application of orthoesters, acetals, etc. U.S. Pat. No. 5,395,544 issued Mar. 7, 1995 by Hagihara, et al. under title "Ester-Containing Working Fluid Composition for Refrigerating Machine" describes a similar potential use of orthoesters apparently in the 2.5-15 wt % compositional range. U.S. Pat. No. 5,575,944 issued Nov. 19, 1996 by Sawada, et al. under title "Acetal-Containing Working Fluid Composition for Refrigerating Machine" similarly describes the use of orthoesters and acetals as drying agents. U.S. Pat. No. 5,720,895 issued Feb. 24, 1998, U.S. Pat. No. 5,869,702 issued Feb. 9, 1999 and U.S. Pat. No. 5,922,239 issued Jul. 13, 1999 by Nakagawa, et al. under title "Polyol Ether Derivatives and Production Methods Therefore" mention the potential use of orthoesters apparently in the range of 0.5-50 wt % based on using refrigeration base oils with particular compositions.

These previous disclosures suggest the use of the refrigerant oil and additives such as orthoformates as initial system charges only—not to the addition of orthoformates or other orthoesters to charged, pressurized systems. Typically, this initial charging of a system involves injection of the oil and additives into the system, followed by evacuation of the system to remove volatile materials including water prior to addition of refrigerant. The system is then pressurized (typically using the compressor 5) to complete the charging process. Orthoformates, typically highly volatile, are removed by this evacuation procedure and therefore may not be present at levels to be effective as hydrolytic drying agents after system start-up.

The present methods describe a series of options in which the orthoformate is efficiently added after system charging to remove accumulated water during operation of the system. Addition of a refrigeration base oil/orthoformate composition as an initial charge is impractical. The presence of a minimum amount of base oil such as polyester is required to provide sufficient lubrication for the system. Replacing base oil on the initial charge with significant amounts of orthoester sacrifices the required lubrication performance. Adding ineffectually small amounts of the orthoester in an initial charge limits the water reduction performance of the orthoester component. The present methods of adding orthoester and other additives allow customized addition of hydrolyte to the particular system. The present methods also ensure that the orthoesters are mixed throughout the a/c or refrigeration system and not added only to the oil sump. This ensures reaction with water wherever it is present throughout the a/c or refrigeration system.

The orthoformate may be introduced into the a/c or refrigeration system alone or in combination with other additives by one of a variety of techniques such as for example from a vacuum packed canister, a pressurized refrigerant can, a syringe or piston operating device, or from an in-line canister, for example using the methods otherwise described herein for injection of additives.

One method of introducing the orthoformate includes introducing the orthoformate at a time prior to the injection of another additive that is unstable in the presence of moisture followed by injection of the other additive at a time before it is known that the orthoformate is fully reacted with moisture in the system. This can include for example the organosilane sealants previously described herein. It can also include dye and dye mixtures typically injected for use in leak detection as previously described herein. Such dyes may include perylene or napthalimide for example. The dye may be carried in a lubricant, such as those described previously, such lubricants can be reactive with moisture. As an example, polyester is often utilized as a lubricant and can be unstable in the presence of moisture.

It has been found that orthoformates generally react more quickly with moisture than organosilanes, and the dye and dye mixtures typically utilized in air conditioning and refrigerant systems. This allows the orthoester to be injected at the same time. Thus, the orthoesters can be included together with the other moisture reactive additive (sealant) in a single vessel for contemporaneous injection into the system. Since the orthoester reacts with water before the organosilane, the formation of deleterious silicone polymers within the system is avoided. Alternatively, the orthoformate or other orthoester can be injected into the system at a time prior to the injection of the other additive followed by injection of the other additive at a time before it is known that the orthoformate is fully reacted with moisture in the system. Previously, it is typically recommended to run systems for a period of time after injection of a drying agent to ensure reaction of the agent with moisture prior to taking other actions dependent on the activity of the drying agent. This can be hours or a day for larger systems. As an example embodiment of the methods described herein the other additive can be injected immediately after or contemporaneously with the orthoformate. Where, for example, a technician uses a hose connected to the system to inject the orthoformate, the technician could use the same hose for injection of the other additive immediately thereafter while leaving the hose connected to the system. These methods can provide simple and quick methods of injecting a moisture-reactive hydrolytic drying agent that provides or remains a fluid, for example, an oil-soluble fluid, upon reaction with water. These methods can also provide effective performance of the additive.

Undesired reaction of additives with moisture within an air conditioning or refrigeration system can be deleterious to the system for at least some of the reasons discussed previously. As an example, undesired reaction of an organosilane away from a leak site can reduce the effective amount of the sealant for reaction at a leak site. It has been found that sealant (such as organosilane) is often injected in amounts far greater than are required for leak sealing in a moisture-free system. This can be seen for example when sealant is found in oil sludge when a system is opened up for examination. In addition to requiring additional sealant undesired reactions of sealant with moisture can result in contamination of the system, such as might cause blockages and otherwise reduce the efficiency of the system. Undesired reaction of dye and/or carrying lubricant can cause the formation of crystal and gel-like substances within the system. Such substances can also cause blockages or otherwise negatively affect the operation of the system.

When orthoformates or other orthoesters react with moisture the result is typically a liquid that is soluble in oil typically found in air conditioning and refrigeration systems. Some non-orthoformate drying agents that have been used in air conditioning systems can themselves react with moisture to form globs that trap particulate and can lead to blockages.

If a leak exists within the system then the amount of drying agent at the leak situs will be overcome by incoming moisture, immediately or over time, and the sealant will react with the moisture at the situs to repair the leak. Thus, the sealant can operate to seal the leak more effectively. Contamination from the sealant is less likely. It is possible that less sealant can be used. Dye will flow through any remaining leak in the system for use in known external leak detection methods, for example involving ultraviolet lights.

Similar viscosity and time of injection requirements, as described above for the organosilane sealing agents above, can be applied to the addition of orthoesters and other drying agents that provide or remain fluid after reaction with water. These requirements can also be applied to the addition of mixtures of orthoesters and sealing agents, or mixtures of orthoesters, sealing agents, and other desired additives such as indicator dyes. For example, an orthoformate, or a mix of orthoformate and organosilane, or a mix of orthoformate, organosilane, and indicator dye, can be mixed with an ISO 32 grade refrigeration compressor oil, for example, in a ratio to maintain a total mixture viscosity above 7 cSt. Compressor oils of other viscosity grades may be used and the composition of the oil may be mineral, polyalkylene glycol, polyolester, or polyalpholefin subject only to the requirement that the orthoester is soluble in the compressor oil at the selected ratio.

Depending on the mechanism of injection selected, the orthoester may be injected as a pure compound or as a solution in the presence of other useful additives.

As an example, the orthoester can be included with compressor oil and organosilane sealant compounds as discussed previously. The mixture ratios can be such that the injected materials have a viscosity minimum of 7 cSt at 40 C and the mixture is of a single phase.

Orthoesters may be selected subject to the requirements above. Preferred orthoesters may be one or some of trimethylorthoformate (TMOF), trimethylorthoacetate (TMOA), triethylorthoformate (TEOF), triethylorthoacetate (TEOA). Triisopropylorthoformate (TIPOF), or triisopropylorthoacetate (TIPOA). Alternatively, other orthoformates with an aryl substituent such as triethylorthobenzoate (TEOB) may be used.

Catalytic effects can be useful in improving the amount of water consumed by a given orthoformate, although it is typically not necessary to use a catalyst. As an example an sulfonated macroreticular solid acid catalyst can be used. This may be used by including the catalyst in a canister in line with the circulating refrigerant medium or as a sidestream.

Further Examples

General Test Procedure

Samples were prepared in approximately 40 gram batches by measuring the desired amount of water into a vial, adding compressor oils and then adding the orthoformate and any additional chemicals. Typically 1 wt % water was used since this amount is insoluble in compressor oils and represents a severe test of the invention. Samples were shaken periodically over several days with observations made on the reaction mixtures over this time period. At the end of the test period, water content of the solution or mixture determination by the Karl-Fischer method, ASTM D6304.

Orthoesters were obtained from Sigma-Aldrich Chemicals. Deionized water was used throughout except as noted.

Results pertinent to the examples below are summarized in Table 6.

TABLE 6

REACTIONS OF ORTHOESTERS WITH WATER

| EXPERIMENT NO. | ESTER | OTHER ADDITIONS | WT % WATER | WT % ESTER | WATER/ESTER MOLE RATIO | Final Water wt % | WT % Water REDUCTION |
|---|---|---|---|---|---|---|---|
| 1 | TMOF | None | 1.00 | 5 | 1.18 | 0.27 | 73 |
| 2 | TEOF | None | 1.00 | 8.25 | 1.00 | 0.08 | 92 |

TABLE 6-continued

REACTIONS OF ORTHOESTERS WITH WATER

| EXPERIMENT NO. | ESTER | OTHER ADDITIONS | WT % WATER | WT % ESTER | WATER/ESTER MOLE RATIO | Final Water wt % | WT % Water REDUCTION |
|---|---|---|---|---|---|---|---|
| 3 | TEOF | None | 1.00 | 4.10 | 2.01 | 0.51 | 49 |
| 4 | TEOA | None | 1.00 | 4.52 | 1.99 | 0.10 | 90 |
| 5 | TEOF | DMSA | 1.00 | 4.10 | 2.01 | 0.54 | 46 |
| 6 | TEOF | Amberlyst 15 ™ | 1.00 | 4.13 | 1.99 | 0.02 | 98 |
| 7 | TEOA | None | 1.00 | 4.52 | 1.99 | 0.10 | 90 |
| 8 | TEOB | None | 1.00 | 6.25 | 1.99 | 0.7982 | 21 |
| 9 | TEOB | 1N KOH | 1.00 | 4.13 | 3.02 | 0.6648 | 33 |
| 10 | TEOB | Amberlyst 15 ™ (DRY) | 1.00 | 4.15 | 3.00 | 0.4655 | 53 |
| 11 | TEOF | 0.0001N KOH | 1.00 | 4.10 | 2.01 | 0.5334 | 47 |
| 12 | TIPOF | None | 1.00 | 3.52 | 3.00 | 0.3202 | 68 |
| 13 | TEOF | Amberlyst A-26 ™ | 1.00 | 4.13 | 1.99 | 0.5110 | 49 |

Amberlyst 15 ™: sulfonated macroreticular solid acid catalyst

Example 13

As shown by experiments 1 and 2 of Table 6, addition of TMOF or TEOF to a mixture of water and mineral oil such that the molar ratio of the water to orthoformates was near 1:1, resulted in a significant reduction of water content.

Example 14

As shown by experiments 2 and 3 of Table 6, doubling the molar quantity of water relative to TEOF shows the same relative reaction with TEOF. One mole of reaction between water and TEOF would reduce the amount of water by 50%, in agreement with the experimentally observed quantity of 49%.

Example 15

As shown by experiments 3 and 4 of Table 6, using TEOA in place of TEOF results in nearly doubling the amount of reaction with water. At a molar ratio of 2:1 of water with orthoester, the TEOF reduced the amount of water by 90 wt % compared to the lesser reduction of 49 wt % with TEOF.

Example 16

As shown by experiments 3, 5 and 6 of Table 6, the addition of catalytic amounts of a solid methanesulphonic acid catalyst in an in-line drying/filtering canister to the 2:1 molar ratio of water:TEOF had little effect on the amount of reaction with water. The reduction in the presence of methanesulphonic acid was 46 wt %, effectively the same as the 49% reduction observed in the absence of the acid. Use of the acid ion exchange catalyst, Amberlyst 15, in an in-line drying/filtering canister gave a doubling of the amount of reaction with water, producing a 98 wt % reduction in water content. A side-stream canister of catalyst would also work.

Example 17

As shown by in experiment 12 of Table 6, TIPOF in the absence of acid catalysis gave a reduction of 68% in water content of a sample when water was present initially at 1 wt % and the molar ratio of water:TIPOF was 3:1. This corresponds to twice the expected water reduction of 33 wt % in the presence of acid catalyst.

Example 18

As shown in experiments 3 and 13 of Table 6, the introduction of Amberlyst 26, a basic ion exchange catalyst, does not deleteriously affect the ability of TEOF to reduce water content in the presence of mineral compressor oil.

Tests have shown that TEOF is particularly well suited as the orthoformate.

Example 19

A 5200 BTU window style air conditioner was modified to include a16 cu. in. sealed liquid line drier and isolation valves with bypass piping for on line change outs. Two liquid moisture indicators were integrated into the circuit for observing moisture levels as low, medium or high as shown by colour changes from pink through green. The unit was put into service under constant load at an ambient temperature of 70 F/21.1 C. Normal operating conditions for the unit typically result in 68 psig suction pressure and a 220 discharge pressure. The following procedures demonstrated the efficacy of orthoesters in water removal from this unit.

1) An injection of 1.25 ml of demineralized water resulted in a rise of discharge pressure from 220 psig to 230 psig—a gain of 5 psig. There was no change in the suction pressure. The liquid moisture indicator showed evidence of moisture contamination.
2) After operation for 24 hours at constant load, the liquid line drier had absorbed system moisture as shown by the moisture indicator.
3) A further 2.5 mL of demineralized water was injected and this resulted in wet condition by the moisture indicator. After 24 hours of operating service at constant load, the liquid moisture indicator had not changed and still showed a wet system. At this point in the experiment the liquid line drier had absorbed water to its full capacity no further water removal could be accomplished.
4) The unit was shut down and system pressure was allowed to equalize. On start up, the unit exhibited fluctuating pressures of 5 to 10 psig on both low side and high side pressures with an accumulation of frosting at the suction line drier. Such fluctuations are characteristic of free moving particulates or a partial blockage with oil logging or in this case moisture intermittently forming at the expansion device.
5) An injection of 29.6 ml of TEOF was administered. Almost immediately the frosting on the suction line drier disappeared. After 1 hour of run time under constant load, the high and low side pressures began noticeably to stabilize with fluctuations decreased to 2 to 4 psig with longer times between the swings compared to the startup.

6) After a further four hours of run time under constant load both the high and low side pressure had stabilized and with 65 psig suction and 210 psig discharge. After a total time from startup of 24 hours, the liquid moisture indicator continued to display a dry system condition.

7) The unit was again shut down and system pressure was allowed to equalize.

On restarting, there was no sign of frosting at the suction line drier. Low side pressure stabilized at 69 psig while high side pressure returned to 225 psig and operation was normal.

It has been found that four different canister content configurations are particularly well suited example embodiments to address the needs of most air conditioning and refrigeration systems to utilize in association with the drying agent injection methods described herein. It is recognized that the canister content configurations may also be usable with other injection methods as desired.

For example, a canister may contain simply a drying agent such as TEOF. The size of the canister may be variable. It has been found that a canister containing about 29.6 ml (about 1 ounce) of TEOF is appropriate for 300-18,000 BTU systems of Table 1 to remove up to 2 ml of moisture. For larger systems having potentially more moisture more than one canister can be used, if desired.

As a further example a canister for a 300-18,000 BTU system can include 29.6 ml of total contents made up of 21 ml of TEOF, 7.4 ml of lubricant and organosilane sealant mixture, and 1.2 ml of leak detection dye mixture, such as for example a napthalmide and polyolester oil mixture. An example sealant mixture is sold as HVACR™ by Cliplight Manufacturing Company of Toronto, Canada. An example dye mixture is sold as Cliplight AC Universal™ dye by Cliplight Manufacturing Company of Toronto, Canada.

As another example a canister for a 18,000-60,000 BTU system can include 88.6 ml of total contents made up of 29.6 ml of TEOF, 56.6 ml of lubricant and organosilane sealant mixture, and 2.4 ml of leak detection dye mixture, such as for example a napthalmide and polyolester oil mixture. An example sealant mixture is sold as HVACR™ by Cliplight Manufacturing Company of Toronto, Canada. An example dye mixture is sold as Cliplight AC Universal™ dye by Cliplight Manufacturing Company of Toronto, Canada.

As an additional example for automotive air conditioning systems a canister can include 44.30 ml of total contents made up of 14.7 ml of TEOF, 28.4 ml of lubricant and organosilane sealant mixture, and 1.2 ml of leak detection dye mixture, such as for example a napthalmide and polyolester oil mixture. An example sealant mixture is sold as SUPERSEAL™ by Cliplight Manufacturing Company of Toronto, Canada. An example dye mixture is sold as Cliplight AC Universal™ dye by Cliplight Manufacturing Company of Toronto, Canada.

A canister can be sold as a kit, either with instructions for use, or in combination with a hose for attaching the canister to the refrigerant stream of an air conditioning or refrigeration system.

Again, the above combinations are example embodiments only. The above combinations are example embodiments of a "total" solution in that a hydrolyte drying agent is provided in combination with an organosilane sealant and a leak detection dye. The hydrolyte drying agent is used to dry the system to improve system operation generally in addition to preparing it for improved effectiveness of the sealant and the dye.

As further examples, an orthoformate hydrolyte drying agent could also be provided together with a dye or dye mixture or, alternatively, with a sealant mixture.

An orthoformate hydrolyte drying agent can be mixed with a dye or dye mixture, or with a sealant mixture, to stabilize the dye and dye mixture, and the sealant mixture, for storage prior to injection into a system. Dyes and dye mixtures containing components that react with moisture have been found in some circumstances to react over time in storage. In this case, where it is desired to stabilize the dye, dye mixture or sealant mixture only for storage purposes a relatively small amount of an orthoformate can be utilized in the container. The amount need only be enough to react with any possible amount of anticipated moisture in the dye, dye mixture or sealant mixture. Again, the orthoformate drying agent will react more quickly with moisture than the dye, dye mixture or sealant mixture.

As can be seen the above methods and devices involving the utilization of orthoesters can increase performance and stability of organosilane mixtures when used separately or combined with dyes, such as for example perylene and naphthalimide dyes and lubricants by reducing air conditioning and refrigeration system moisture content. A lesser, or optimized, amount of organosilane, or dye can be used in an air conditioning and refrigeration system while allowing greater potential for chemical productivity performance and stability while on route to its intended target. Increased chemical reaction can result in more work done because of decreased reaction with internal residual moisture as is the case of chemical solutions which form a solid polymer, gels or crystallize when coming in contact with water.

Moisture laden air can enter systems in manufacturing or when being serviced or when loss of system refrigerant creates a lower than atmospheric condition on the suction side of the compressor which results in drawing air containing a moisture content into the system while in operation. In the case of organosilanes where the intended purpose is to react with atmospheric moisture externally at the point of a refrigerant leak forming a solid polymer the performance of the reaction can be affected by internal moisture contents within the system away from the leak situs. The volume of organosilanes has been found to be increased to offset premature reaction with internal system moisture. The pre polymerization has been found to reduce the amount of chemical performance reaching the intended purpose while possibly leaving residual polymer particulate as in the case of a high system moisture content internally causing a potential blockage and mechanical breakdown. When moisture reactive dyes, such as perylene and naphthalimide, are used for the detection of refrigerant leaks a simulate reaction to internal moisture occurs. The dyes when coming in contact with internal system moisture will begin to form gels and in some cases will solidify forming a crystallized substance. This by product of the reaction to internal system moisture will also as in the case of the organosilanes cause a blockage to refrigerant flow and eventually result in a mechanical breakdown. Critical blockages will usually form at the expansion valves and in capillary tubes, reducing refrigeration effect and ultimately causing a catastrophic mechanical failure.

When moisture in the form of water vapor is present in an air conditioning or refrigeration system for an extended time, it combines with refrigerant gases to form acids which cause corrosion of system components, copper plating, and the deterioration of motor insulation leading to system failure. Refrigerants such as HCFC22 and HFC134a, which contain fluorine, are hydrolyzed to form hydrofluoric acid.

This acid forms a solution with water and causes oil degradation to form organic acids and subsequent metal corrosion and formation of sludge. The sludge and corrosion particles restrict refrigerant flow in regulators, filters and strainers which impairs efficient operation of the system.

The introduction of organosilanes for the purpose of sealing refrigerant leaks or as in the case of dyes for locating refrigerant leaks compounds the affect of system degradation forming increased particulate and sludge contamination.

The recommended procedure for water removal from air conditioning and refrigeration systems is by refrigerant gas removal and evacuation of the system with a vacuum pump to pressures below 0.05 Pa.

Liquid line driers can also be installed to help remove small amounts of moisture. The primary objective of these driers is to help with the removal of particulate and sludge.

Installation of driers or evacuation by vacuum pump requires system shutdown and downtime with subsequent losses of time and money.

Embodiments of the methods and devices described herein can provide an alternative method for water removal by chemically reacting with water to transform it to a more benign product. Such a chemical reactant reduces water content in the system without requiring removal of refrigerant or application of a deep vacuum.

The approach of combining a chemical reactant to an organosilane separately or within a specified mixture of lubricating oil and refrigerant dye allows a one step procedure to remove moisture, seal micro refrigerant leakage and expose larger points of leakage with a dye stain so that an efficient and economical repair can be exercised. Benefits of a chemical reactant mixture involving Organosilane separately and or including Perylene, Naphthalimide dye and lubricating oils can include:
1) Reduced service time
2) Extended unit life
3) Increased efficiency and therefore reduced energy consumption
4) Improved application of chemical sealants.

Thus, embodiments of the methods and devices described herein can be used to enhance the ability of chemicals which react to water for a specific purpose or become unstable when in contact with water by including orthoformates for the removal of water from air conditioning or refrigeration systems to enhance the potential of organosilanes and dyes, such as for example perylene and naphthalimide, lubricating oils, or the combination of them as a mixture. As appropriate, these applications can be introduced to a system at the time of manufacturing or servicing of a refrigerant free system or to operating refrigeration or air conditioning systems which have absorbed water from the environment.

Some embodiments can include the introduction of orthoformates in a non-acidic environment into a refrigeration or air conditioning system with subsequent reduction of water content through hydrolysis. Some embodiments provide for the use of specific catalytic media and specific orthoformates to provide up to enhance the reduction of the amount of water. This may include the use of acidic or basic macroreticular ion exchange resins, such as acid ion exchange resins to enhance the reactivity of water with orthoformates beyond a 1:1 molar ratio of water and orthoformate. The resins may be all or part of a filtering device as part of the a/c or refrigeration system. Neutralizing media may be introduced into air conditioning and refrigeration systems with said orthoformates.

Some embodiments provide for introduction of orthoformates into refrigeration and air conditioning systems in combination with refrigerant compressor oils. Some embodiments provide a method to remove reaction products from the resultant mixture after reaction of the water. Removal of reaction products of orthoformates and water by partial or full recovery of the system refrigerant can be performed for example by a) shutting down the system to allow pressure in the a/c or refrigeration system to equalize and sufficient time for the compressor oil to migrate back to the sump, and b) using a small positive displacement pump or vacuumed vessel attached to the suction charging valve to remove the lighter reaction products from the sump.

Some embodiments can be applied when orthoformates are part of the refrigeration oil/refrigerant composition originally installed in the air conditioning or refrigeration system or as part of a retrofit process during system service. In this latter case, injection of the orthoformate alone or in useful mixtures with other additives can, for example, be accomplished by one of several methods such as introduction from a vacuum packed can into the low side charging valve of the system while in operation, introduction of the contents from a pressurized refrigerant can into the low or high side charging valve, introduction of the contents from a vacuum packed can into the high or low side charging valve on a system which has had the refrigerant recovered and is in vacuum, injection of contents from a syringe or piston operating device (vessel) utilizing modulated positive displacement into low or high side charging valve when the machine is operating or not operating, inject of the contents using an inline canister into the high or low side charging ports.

According to one aspect is provided a method of maintaining an air conditioning or refrigeration system charged and pressurized with a system fluid comprising a refrigerant, the method comprising: (a) introducing into the system fluid, a maintenance fluid containing a hydrolytic drying agent which maintains a fluid form upon hydrolytic reaction with water, and having a maintenance fluid viscosity; and (b) causing the system to distribute said maintenance fluid throughout the system fluid.

According to another aspect, the method further comprises c) determining if the system fluid continues to indicate the existence of water in the system, and, if so, then repeating a), b), and c).

According to one aspect, the hydrolytic drying agent is introduced into the system fluid at a controlled rate.

According to another aspect, the hydrolytic drying agent forms or maintains an oil-soluble form after reacting with water.

According to one aspect, the hydrolytic drying agent is an orthoester. In certain embodiments, the orthoester is selected from the group consisting of trimethylorthoformate, trimethylorthoacetate, triethylorthoformate, triethylorthoacetate, triisopropylorthoformate, triisopropylorthoacetate, and triethylorthobenzoate.

According to one aspect, the maintenance fluid viscosity is selected such that, after said maintenance fluid is introduced, a sump viscosity of a sump mixture of the air conditioning or refrigeration system is affected by less than a 10% reduction.

According to a further aspect, a controlled rate of introduction of the maintenance fluid is selected to avoid liquid slugging and to maintain sufficient lubricant for proper operation of the compressor.

According to a further aspect, the controlled rate is less than 6% (by volume) of a total oil content of the system per minute.

According to a further aspect, the controlled rate is less than 6 cc/second.

According to yet a further aspect, the maintenance fluid viscosity is selected such that, when said maintenance fluid is introduced, a sump viscosity of a sump mixture of the air conditioning or refrigeration system does not fall below 29 cst at 40° C.

In another embodiment, the maintenance fluid viscosity is not less than 7 cst at 40° C.

In yet another embodiment, the maintenance fluid further comprises a sealant.

In another embodiment, the sealant is an organosilane.

In yet a further embodiment, the maintenance fluid further comprises a refrigerant.

In yet a further embodiment, the maintenance fluid further comprises an indicator dye.

In another embodiment, the indicator dye is a fluorescent dye.

In yet another aspect, the method further comprises (c) introducing into the system fluid, simultaneously with step (a) or (b), shortly after step (a), or shortly after step (b), a sealant fluid comprising a sealant and having a sealant fluid viscosity; and (d) causing the system to distribute said sealant fluid throughout the system fluid.

According to a further aspect, the sealant fluid is introduced at a second controlled rate.

According to a further aspect, the maintenance fluid viscosity and the sealant fluid viscosity are selected such that, when said sealant fluid is introduced, a sum viscosity of a sump mixture of the air conditioning or refrigeration system is affected by less than a 10% reduction.

According to yet a further aspect, a controlled rate of introduction of the maintenance fluid and a second controlled rate of introduction of the sealant fluid are selected to avoid liquid slugging and to maintain sufficient lubricant for proper operation of the compressor.

According to yet a further aspect, the controlled rate and the second controlled rate combine to less than 6% (by volume) of a total oil content of the system per minute.

According to yet a further aspect, the controlled rate and the second controlled rate combine to less than 6 cc/second.

According to yet a further aspect, the maintenance fluid viscosity and the sealant fluid viscosity are selected such that, when said sealant fluid is introduced, a sump viscosity of a sump mixture of the air conditioning or refrigeration system does not decrease below 29 cst at 40° C.

According to a further aspect, the sealant fluid viscosity is not less than 7 cst at 40° C.

In certain embodiments, the method further comprises (c) passing said hydrolytic drying agent through a filter/dryer comprising a solid catalyst.

In a further aspect, the solid catalyst is selected from the group consisting of a solid acid catalyst and a solid basic catalyst.

In yet a further embodiment, the solid catalyst is a macroreticular ion exchange resin.

In yet a further embodiment, the macroreticular ion exchange resin is Amberlyst 15.

According to a further aspect, the filter/dryer also contains a filter drying medium.

In one embodiment, the filter drying medium is selected from the group consisting of any one or more of alumina, charcoal and molecular sieves, either in separate layers or admixed with said ion exchange resin.

According to one aspect is provided a device for use in maintaining an air conditioning or refrigeration system, the device comprising: (a) a sealed vessel adapted to receive a hose assembly forming, at a proximal end, a sealed fluid connection to a refrigerant fluid of the system, and having at a distal end, a receiving unit for the vessel, and (b) in the sealed vessel: (i) a fluid containing a hydrolytic drying agent which maintains a fluid form upon reaction with water, and (ii) a sealant.

In a further embodiment, the hydrolytic drying agent is an orthoester.

In a further embodiment, the orthoester is selected from the group consisting of trimethylorthoformate, trimethylorthoacetate, triethylorthoformate, triethylorthoacetate, triisopropylorthoformate, triisopropylorthoacetate, and triethylorthobenzoate.

In yet a further embodiment, the sealant is an organosilane.

In yet a further embodiment, the fluid has a viscosity of not less than 7 cst. At 40° C.

In a further embodiment, the fluid further comprises an indicator dye.

In yet a further embodiment, the indicator dye is a fluorescent dye.

According to another aspect, is provided a charged, pressurized air conditioning or refrigeration system, having: a compressor, a high side, a low side, and a refrigerant fluid having a refrigerant and travelling from the high side to the low side and back; a canister, containing a maintenance fluid comprising a hydrolytic drying agent which maintains a fluid form upon reaction with water; a hose assembly having a manually operated valve, and forming, at a proximal end, a sealed fluid connection to the refrigerant fluid, and having, at a distal end, a receiving unit for the canister; said distal end capable of puncturing or otherwise opening said canister to form a fluid connection between the maintenance fluid and the refrigerant fluid.

In a further embodiment, the hydrolytic drying agent is an orthoester.

In yet a further embodiment, the orthoester is selected from the group consisting of trimethylorthoformate, trimethylorthoacetate, triethylorthoformate, triethylorthoacetate, triisopropylorthoformate, triisopropylorthoacetate, and triethylorthobenzoate.

In a further embodiment, the maintenance fluid also comprises a sealant.

In a further embodiment, the sealant is an organosilane.

In a further embodiment, the air conditioning or refrigeration system further comprises a can tapper for puncturing or otherwise opening said canister.

In a further embodiment, the air conditioning or refrigeration system further comprises a flow rate controller which controls or restricts the maximum flow rate of the maintenance fluid into the refrigerant fluid.

In yet a further embodiment, the flow rate controller is an orifice.

In a further embodiment, the fluid connection is formed between the maintenance fluid and the refrigerant fluid, the maintenance fluid flows into the maintenance fluid at a maximum flow rate of 6 cc/second.

In a further embodiment, the air conditioning or refrigeration system further comprises a filter/dryer canister, comprising a solid catalyst, through which the refrigerant fluid travels.

In yet another embodiment, the solid catalyst is selected from the group consisting of a solid acidic catalyst and a solid basic catalyst.

In a further embodiment, the solid catalyst is a macroreticular ion exchange resin.

In a further embodiment, the resin is Amberlyst 15.

In yet a further embodiment, the filter/dryer canister also contains a filter drying medium.

In yet a further embodiment, the filter drying medium is selected from the group consisting of any one or more of alumina, charcoal, and molecular sieves, either in separate layers or admixed with said catalyst.

In a further embodiment, a kit is provided comprising a hose assembly capable of forming, at a proximal end, a sealed fluid connection between an inside of the hose assembly and a refrigerant fluid in an air conditioning or refrigeration system, and capable of attaching, at a distal end, to the vessel, said distal end capable of puncturing or otherwise opening said vessel to form a fluid connection between the inside of the hose and the fluid.

Further variations and modifications can be made without departing from the spirit of this invention. It should be understood that the form of the embodiments described above, including the Figures and Tables, is illustrative only and is not intended to limit the scope of the present invention.

It will be understood by those skilled in the art that this description is made with reference to the illustrative embodiments and that it is possible to make other embodiments employing the principles of the invention which fall within its spirit and scope as defined by the following claims.

We claim:

1. A method of maintaining an air conditioning or refrigeration system charged and pressurized with a system fluid comprising a refrigerant, the method comprising:
    a) introducing into the system fluid, a maintenance fluid containing a hydrolytic drying agent which maintains a fluid form upon hydrolytic reaction with water, and having a maintenance fluid viscosity; and
    b) causing the system to distribute said maintenance fluid throughout the system fluid,
    wherein the hydrolytic drying agent is an orthoester, and the orthoester is selected from the group consisting of trimethylorthoformate, trimethylorthoacetate, triethylorthoformate, triethylorthoacetate, triisopropylorthoformate, triisopropylorthoacetate, and triethylorthobenzoate.

2. The method of claim 1 further comprising: c) determining if the system fluid continues to indicate the existence of water in the system, and, if so, then repeating a), b), and c).

3. The method of claim 1 wherein the hydrolytic drying agent forms or maintains an oil-soluble form after reacting with water.

4. The method of claim 1 further comprising passing said hydrolytic drying agent through a filter/dryer comprising a solid catalyst.

5. The method of claim 1 further comprising:
    c) introducing into the system fluid, at a time after (a) and (b), a sealant fluid comprising a sealant; and
    d) causing the system to distribute said sealant fluid throughout the system fluid.

6. The method of claim 1 further comprising:
    c) introducing into the system fluid, simultaneously with (a), a sealant fluid comprising a sealant and having a sealant fluid viscosity;
    d) causing the system to distribute said sealant fluid throughout the system fluid.

7. A method for injecting sealant into an air conditioning or refrigeration system having a compressor, a high pressure side ("high side"), and a low pressure side ("low-side"), the method comprising:
    injecting the sealant and a lubricant as a mixture in a quantity to provide sufficient lubrication to maintain proper operation of the compressor when the sealant is fully distributed in the system, while injecting the sealant so as to maintain proper operation of the compressor before the sealant is fully distributed in the system,
    wherein the mixture further comprises a drying agent, the drying agent comprises an orthoformate, and the orthoformate is selected from the group consisting of trimethylorthoformate, triethylorthoformate, and triisopropylorthoformate.

8. The method of claim 7 wherein the system is a hermetically sealed air conditioning system and injecting the sealant comprises injecting the sealant comprises injecting the sealant in the hermetically sealed air conditioning or refrigeration system.

9. The method of claim 7 wherein the system is a charged air conditioning and refrigeration system and the sealant is injected into the charged system.

10. A device for use in maintaining an air conditioning or refrigeration system, the device comprising:
    a) a sealed vessel adapted to receive a hose assembly forming, at a proximal end, a sealed fluid connection to a refrigerant fluid of the system, and having at a distal end, a receiving unit for the vessel; and
    b) in the sealed vessel: (i) a fluid containing a hydrolytic drying agent which maintains a fluid form upon reaction with water, and (ii) a sealant,
    wherein the hydrolytic drying agent is an orthoester, and the orthoester is selected from the group consisting of trimethylorthoformate, trimethylorthoacetate, triethylorthoformate, triethylorthoacetate, triisopropylorthoformate, triisopropylorthoacetate, and triethylorthobenzoate.

11. The device of claim 10 wherein the hydrolytic drying agent forms or maintains an oil-soluble form after reacting with water.

12. The device of claim 10 wherein the hydrolytic drying agent forms or maintains a form soluble in mineral oil after reacting with water.

13. A device for use in maintaining an air conditioning or refrigeration system, the device comprising:
    a) a sealed vessel adapted to receive a hose assembly forming, at a proximal end, a sealed fluid connection to a refrigerant fluid of the system, and having at a distal end, a receiving unit for the vessel; and
    b) in the sealed vessel: a fluid containing a hydrolytic drying agent which maintains a fluid form upon reaction with water,
    wherein the hydrolytic drying agent is an orthoester, and the orthoester is selected from the group consisting of trimethylorthoformate, trimethylorthoacetate, triethylorthoformate, triethylorthoacetate, triisopropylorthoformate, triisopropylorthoacetate, and triethylorthobenzoate.

14. The device of claim 13 wherein the fluid does not contain a sealant.

15. A kit comprising: the device of claim 5; a hose assembly capable of forming, at a proximal end, a sealed fluid connection between an inside of the hose assembly and a refrigerant fluid in an air conditioning or refrigeration system, and capable of attaching, at a distal end, to the vessel, said distal end capable of puncturing or otherwise opening said vessel to form a fluid connection between the inside of the hose and the fluid; and instructions for attaching the proximal end of the hose assembly to the air conditioning or refrigeration system and for attaching the distal end of the hose assembly to the device.

* * * * *